Patented Sept. 5, 1922.

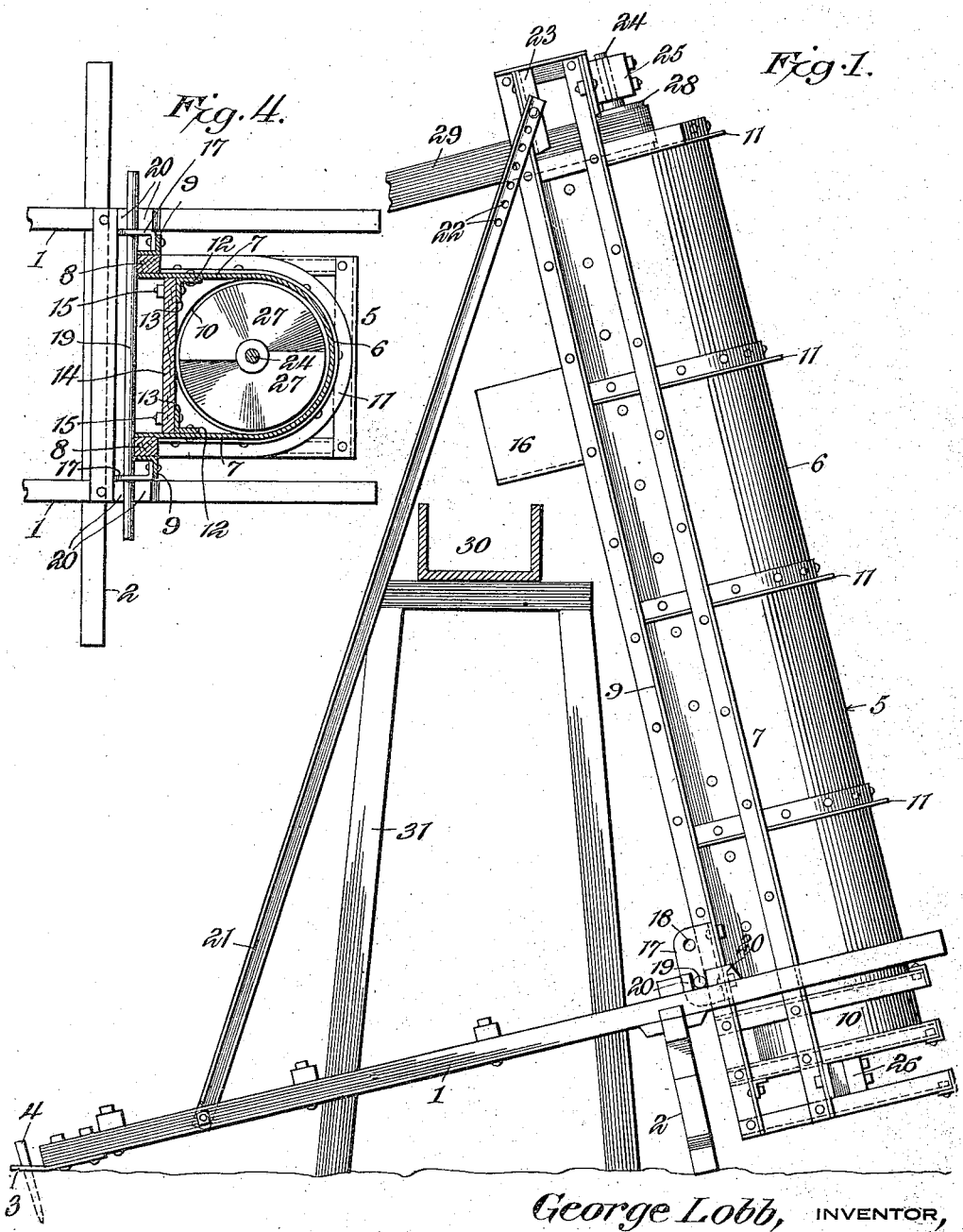

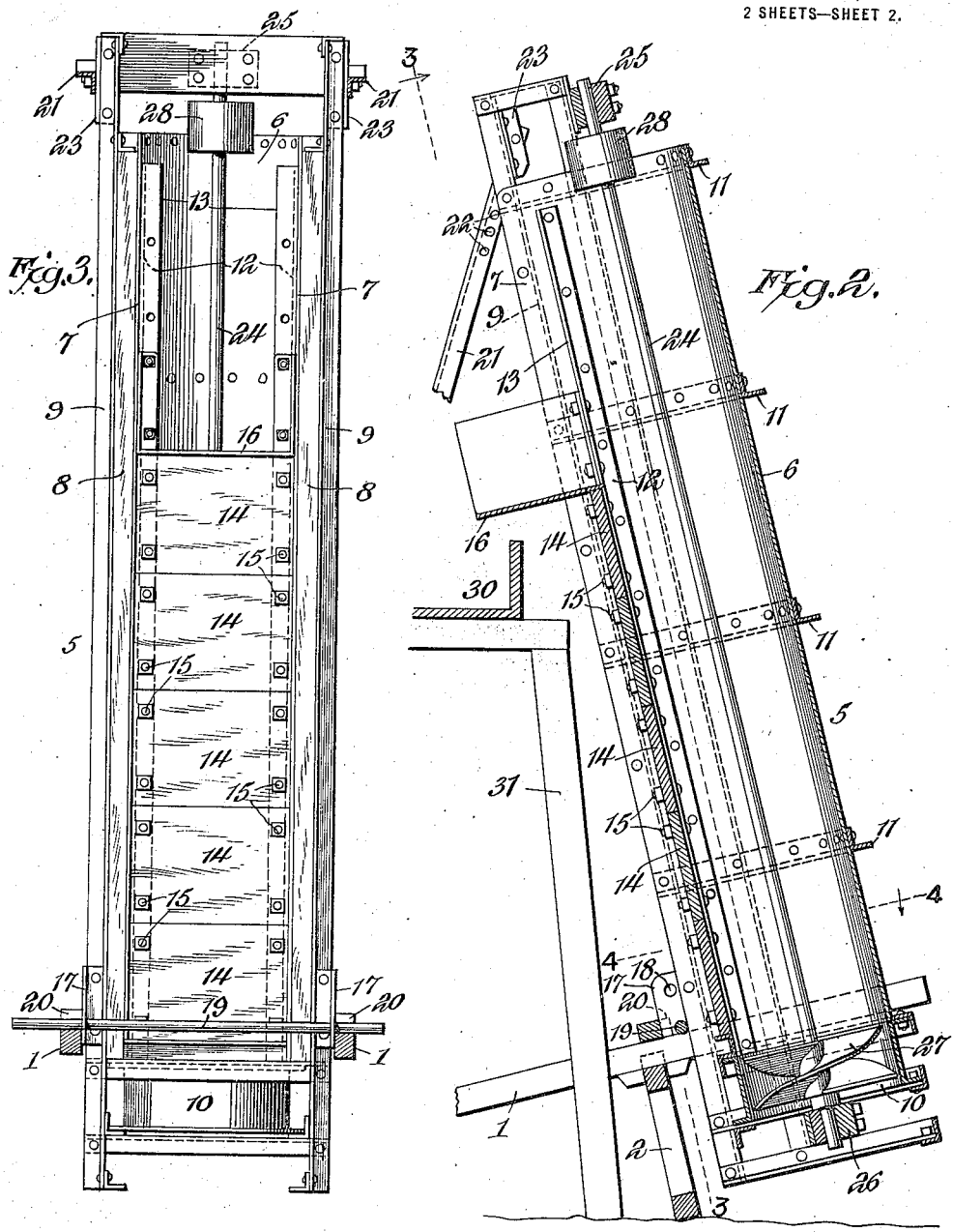

1,428,173

UNITED STATES PATENT OFFICE.

GEORGE LOBB, OF SELMA, CALIFORNIA.

ROTARY PUMP.

Application filed October 9, 1920. Serial No. 415,787.

*To all whom it may concern:*

Be it known that I, GEORGE LOBB, a citizen of the United States, residing at Selma, in the county of Fresno and State of California, have invented a new and useful Rotary Pump, of which the following is a specification.

This invention has reference to pumps, and its object is to provide a portable and inexpensively constructed pump capable of operating in shallow streams and particularly adapted for pumping water for irrigating purposes. There are various localities in the United States where irrigating systems are not installed, but where shallow streams are available and where cheaply obtained pumping outfits may be set up at the banks of or even across the stream and the water pumped to a sufficient height to flow over the adjacent territory, thereby irrigating the ground at a relatively insignificant cost. In this manner, and by means of the invention, tracts of land have been successfully irrigated in localities where the results of irrigation had not previously been obtained, while the ready portability of the invention permits the shifting of the water elevating means or pump from place to place as needed. In accordance with the invention, there is provided a pump which may be readily installed in shallow water and yet will lift relatively large quantities of water to a height permitting the flow of water upon the surrounding ground for a sufficient distance to answer the purposes of irrigation. The improved pump is of the rotary type to avoid the necessity of sinking the intake end to a considerable depth in water. The whole structure is of a character permitting it to be mounted upon a portable frame and to be operated by any one of numerous forms of explosion engines.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings:

Fig. 1 is a side elevation of a portable type of shallow water pump embodying the invention.

Fig. 2 is a vertical section of the pump omitting some parts shown in Fig. 1.

Fig. 3 is a section on the line 3—3 of Fig. 2.

Fig. 4 is a section on the line 4—4 of Fig. 2.

Referring to the drawings there is shown a support 1 which may be in the form of a frame readily movable from place to place, and in many localities such a frame may project over or even span a small stream. The frame is carried near one end by another frame 2 serving the purpose of a leg so that the frame 1 may be elevated at one end while at the other end eyes 3 are connected to the frame so as to be traversed by pins 4, to be driven into the ground, as shown in Fig. 1.

The frame 1 is arranged to carry a pump barrel 5 which may be conveniently made of sheet metal or other suitable material bent cylindrically for a portion of its circumference, as indicated at 6, and from thence continued in parallel tangential form, as indicated at 7, the ends of the tangents being screwed to longitudinal beams 8, in turn connecting to longitudinal angle strips 9. The parts are riveted or otherwise fastened together with a short section 10 of the pump barrel 5 shaped into a complete cylinder and, in the operative position of the pump, the fully cylindrical portion 10 is lowermost.

The barrel 6 of the pump may be made of sheet metal strengthened and stiffened by hoops 11 of angle iron, or the hoops may be of flat material and the barrel 6 may be formed of staves held in place by the hoops 11.

Fast to the inner walls of the tangential portion 7 of the pump barrel are angle bars 12 riveted or otherwise secured in place and presenting angle portions 13 away from the interior of the barrel 6 so as to be substantially in alinement with each other in a plane about tangential to a circle corresponding to the inner wall of the cylindrical part 10 of the pump barrel. The angles 13 provide an abutting wall for a suitable number of doors or closures 14 held in place by bolts 15 or in any other appropriate manner so that the wall of the pump barrel remote from the cylindrical wall 6 may be built up or lowered as may be found desirable. In order to facilitate discharge of water from the upper end of the sectional wall built up of the doors or closures 14, there is provided a readily removable and adjustable spout 16 bolted or otherwise secured to the angle strips 12 permitting the adjustment of the spout as may be required.

The beams 8 of the pump structure 5 are provided with brackets 17 arranged on opposite sides of the pump and provided with a plurality of matching perforations 18 to be traversed by a pivot pin 19, whereby the pump barrel may be pivotally carried on the pin 19 in turn supported by the longitudinal beams of the frame 1 and lodging between guide blocks 20.

Fast at one end of the frame 1 near the end anchored by the pins 4 are stay bars 21, each extending to a high point of the frame of the pump barrel and provided with a row of perforations 22 for the attachment of the stay bars 21 to brackets 23, whereby the angle of inclination of the pump barrel may be varied.

Extending axially through the cylindrically shaped portion of the pump barrel 5 is a shaft 24 having journal bearings 25, 26, above the top and below the bottom of the pump barrel. The shaft 24 where within the fully cylindrical portion of the pump barrel carries volute blades 27 arranged to lift water through the cylindrical portion 10 and from the latter up through the remainder of the pump barrel until a height is reached permitting the outflow of the water through the spout 16. In order to avoid any back flow of water through the volute impeller, the volutes 27 in interlaced relation, are provided. Experience has shown that two such interlaced volutes are sufficient for the purpose of the invention.

At the end of the shaft 24, remote from the volute impeller, there is provided a pulley 28 permitting the application of a belt 29 for driving the shaft from a suitable source of power, of which an explosion engine may be taken as an example, since explosion engines are obtainable in small units and most persons who would desire to use a pump like that of the invention are familiar with the operation of such engines.

When a pump such as shown and described is installed on the banks of or across a small stream, the pump barrel 5 is rocked on the pivot pin 19 sufficiently to bring the barrel into a nearly upright position, with the spout 16 at an appropriate height. This moves the pump barrel 5 into the stream of water to be pumped, which stream may be of sufficient capacity for the purpose of the invention. Furthermore, underlying the discharge end of the spout 16 is a trough or conduit 30 which may be supported by a trestle 31 and may lead to any point where the water elevated by the pump may be disposed of for irrigating or other purposes.

The volutes or impellers tend to impart a rotating or swirling movement to the water, but this is, in large part, broken up by the non-circular cross sectional shape of the interior of the pump barrel above the impellers.

What is claimed is:

1. A pump for irrigation and other purposes, comprising a pump barrel of non-circular cross section, with an intake end of cylindrical form, rotatable water impelling means in the cylindrical end, and closures disposed along the non-circular portion of the pump barrel for providing outlets for the pumped water at different levels.

2. A pump for irrigating purposes, comprising a suitable support, a pump barrel pivotally mounted thereon to be moved toward and from an upright position, brace bars for holding the pump bars in different positions of slant, rotary water impelling means in the pump barrel and extending above the top thereof, driving means for the rotary means, and outlets for the pump barrel arranged at different heights and each provided with means for opening and closing the outlets controlled thereby.

3. A pump for irrigation purposes, comprising a pivotally mounted pump barrel capable of movement toward and from an upright position, rotary means in the pump barrel for elevating water therein, a series of gates or closures arranged along one side of the pump barrel for permitting the escape of water at the different heights at will, and means for holding the pump barrel either in an upright or in a slanting position.

4. A pump for irrigation purposes, comprising a pump barrel having one side flat and provided with a series of gates at different heights and the other side of the barrel being of rounded conformation, whereby the cross sectional shape of the pump barrel is in the main non-circular, and said pump barrel having an intake portion of circular cross section, and water lifting means in the part of the pump of circular cross section comprising substantial volute blades.

In testimony, that I claim the foregoing as my own, I have hereto affixed my signature.

GEORGE LOBB.